Figure 1:
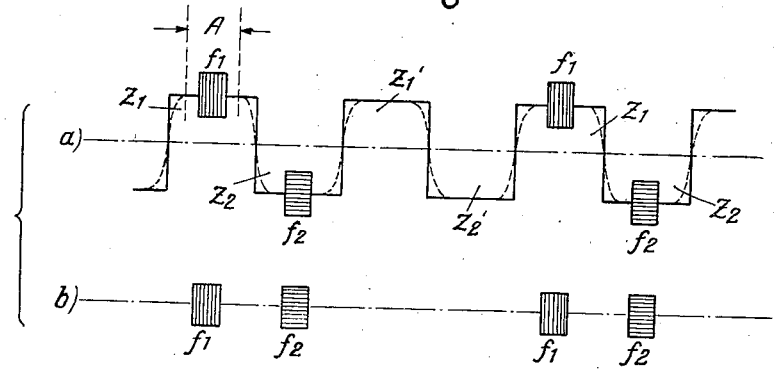

Dec. 23, 1941.  H. NASS  2,267,211
RADIO DIRECTION FINDING SYSTEM
Filed June 23, 1939  2 Sheets—Sheet 1

Inventor:
Heinrich Nass
by *E. D. Phinney*
Attorney.

Dec. 23, 1941.  H. NASS  2,267,211
RADIO DIRECTION FINDING SYSTEM
Filed June 23, 1939   2 Sheets-Sheet 2

Inventor:
Heinrich Nass
by E.O. Phinney
Attorney.

Patented Dec. 23, 1941

2,267,211

UNITED STATES PATENT OFFICE 2,267,211

RADIO DIRECTION FINDING SYSTEM

Heinrich Nass, Berlin, Germany, assignor to C. Lorenz Aktiengesellschaft, Berlin-Tempelhof, Lorenzweg, Germany, a company Application June 23, 1939, Serial No. 280,707
In Germany June 19, 1937

7 Claims. (Cl. 250—11)

This invention relates to radio direction finding systems, and more particularly to methods of and means for obtaining bearings by means of rotating radio beacon transmitters.

It is known in the art for the purpose of guiding movable vehicles, such as airplanes, for example, to emit from a radio transmitter system a succession of two alternately keyed directional radiations of different kind, such as dots and dashes, the electromagnetic fields of which produce a line of constant field intensity on which they amalgamate to a continuous dash line, and to subject this line of constant field intensity to a continuous rotation in the horizontal plane. At the instant when the rotating continuous dash line passes through a given reference compass direction, the north point, for instance, the radio transmitter system emits a non-directional signal. The time which elapses between the receipt of the continuous dash and the detection of the non-directional signal is then determined in a radio receiving equipment by a counting mechanism in which the signals of different kind are counted and subtracted from one another with respect to the non-directional reference signal.

The copending U. S. application "Direction finding systems," Serial No. 246,300, filed December 17, 1938, in the name of Hans Eggers with assignment to C. Lorenz Aktiengesellschaft of Berlin-Tempelhof, Germany, relates to useful improvements over prior art as referred to in the last paragraph. In contradiction to the heretofore known methods of and means for determining positions, according to which a directional finding receiver is operated by the initial voltage peak of an incoming signal, the last mentioned copending application proposes means for utilizing the integral of the entire signal for controlling the counting mechanisms cooperatively connected with the receiving equipment. The line of constant field intensity coacting with such receiving equipment and subject to rotation in a terrestrial beacon transmitter is produced by two mutually displaced and alternately effective radiation patterns, each of which is modulated with a distinguishing frequency different from that of the other. These patterns are alternately rendered effective during a short period of time followed by an ineffective or silent period of given duration. The succession of differently modulated and alternately keyed signals is picked up by the directional finder in which the different modulation frequencies after rectification are impressed upon filter chains which effect segregation therebetween whereupon each modulation frequency is conveyed to the proper of the counting mechanisms thus functioning in response to one frequency only.

My present invention more closely relates to improvements in and relating to radio direction finding systems of the type disclosed in the above mentioned application, and has for an object to considerably simplify the means required for securing satisfactory operation therein.

In one specific aspect, my invention consists in new and useful improvements in radio beacon transmitters of the type referred to in the foregoing.

According to the main feature of this invention, means are provided in a rotating radio beacon transmitter for alternately modulating the oscillations radiated by the high frequency transmitter with signals of different modulation frequencies and of exactly predetermined length, the said modulation being effective in synchronism with the keying of the reflectors cooperating with the high frequency transmitter.

Figure 2A:
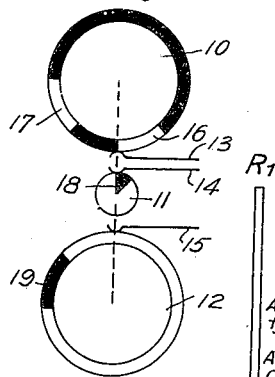
Figure 2:
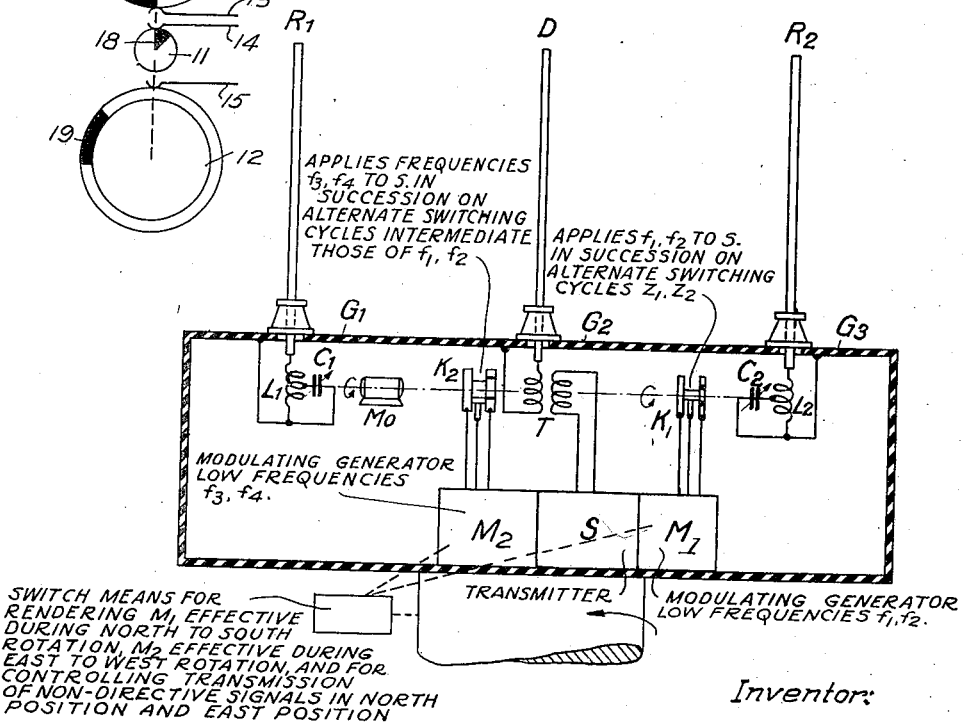
Figure 3:
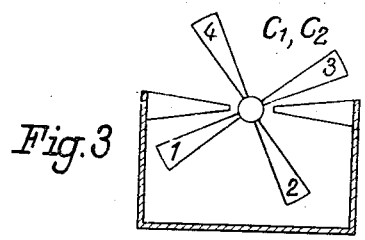
Figure 4:
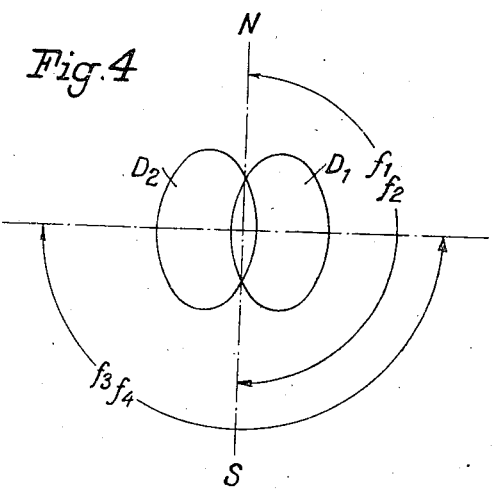
Figure 5:
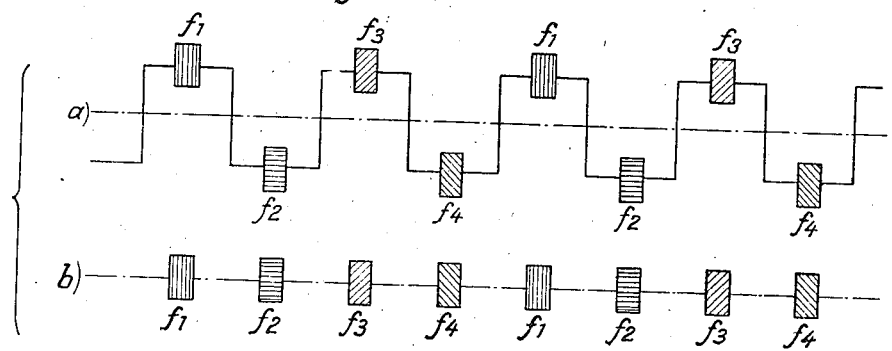

The invention will be more readily understood from the following description taken in conjunction with the accompanying drawings, in which Fig. 1 is a graphic showing explanatory of the invention, Fig. 2 is a schematic side elevation of a rotating radio beacon transmitter according to this invention, Fig. 2A is a plan view explaining the operation of a commutator, Fig. 3 schematically shows a means applicable in the system shown in Fig. 1, while the Figs. 4 and 5 are further their graphs explanatory of my invention.

Referring to Fig. 1, the full line at $a$ represents a high frequency carrier wave as keyed and radiated from the transmitter, and the differently hatched rectangles indicate the different low frequency modulation signals with which the carrier wave is modulated. The graph at $b$ shows the signal conditions present at the output circuit of a radio direction receiver after rectification, as will hereinafter be more fully described. It is assumed in the case under consideration that the signals of each of the direction radiation patterns involve equal intensities, that is to say, the receiving position is in alignment with the continuous dash line and is believed to follow the rotational movement thereof as a result of the rotation of the radio beacon transmitter.

The rectangular portions above the zero or reference axis $a$ of Fig. 1 represent the high frequency signals of one of the directional radiation patterns and those below this axis correspond to the high frequency signals of the other of the patterns which are set up in a transmitter in response to the effectiveness of one reflector during the ineffectiveness of the other reflector as known in the art. Thus, the high frequency carrier signal $Z_1$ is produced during the effectiveness of one pattern, whilst the carrier signal $Z_2$ is produced during the active period of the other directional pattern. Now, in the course of effectiveness of the carrier signal $Z_1$, the high frequency carrier wave is modulated with a low frequency signal $f_1$ of exact length, while the signal is replaced by a second signal $f_2$ of a different frequency for modulating the carrier wave during the effectiveness of the other high frequency signal $Z_2$. The length or duration of the high frequency carrier signals must in each and every instant be at least that of the modulating low frequency signals, but in a preferred embodiment means are provided for making the carrier signals substantially longer than the low frequency modulating signals.

The two low frequency modulated carrier signals are transmitted in a close succession, whereupon the low frequency modulation becomes interrupted. However, the low frequency modulation gaps are according to one feature of this invention filled out by a succession of further carrier signals, since it has been discovered that a carrier wave decay simultaneous with such low frequency modulation interruption produces undesired action of regulation in a receiver equipped with automatic amplitude regulating devices. Such further carrier signals remain unmodulated as shown in the upper part of Fig. 1 at $Z_1'$ and $Z_2'$ and are effective only in the high frequency portion of a receiver for controlling the aforementioned amplitude regulating devices, while being suppressed in the low frequency portion by the use of a band filter preceding the rectifying means thereof and adapted to reject the high frequency keying signals and to freely pass the two low frequencies $f_1$ and $f_2$ which control the signal counting mechanisms forming part of the receiving system as disclosed in the copending application referred to in the foregoing.

The signals of the high frequency carrier wave resulting from the alternate keying of the reflectors are shown in the upper part of Fig. 1 as of perfect rectangular form which may actually be obtained, e. g. by the provision of keying relays inserted in the reflecting dipoles. However, the arrangement according to this invention involves the essential advantage that the shape of the high frequency carrier signals has no influence upon the proper functions of the system so that means for correctly dimensioning these signals with respect to form and duration may be omitted. The single requirement which must be satisfied is that these signals must have a range of constant amplitude which is at least equal to, but preferably longer than the length or duration of the low frequency modulation signals as indicated at A in Fig. 1. It is thus possible to key the reflectors by a gradual operating means and thus to operate with high frequency carrier signals of trapezoidal or rounded shape as shown by the dash line in this figure. By virtue of this discovery, the keying of the reflectors may in accordance with a further feature of my invention be effected by detuning them in a simple manner by means of rotatable condensers.

A rotating radio beacon transmitter as designed from the above mentioned viewpoints is schematically shown in Fig. 2, in which reference letter D denotes a radiating dipole, while $R_1$ and $R_2$ designate reflector dipoles adapted to be alternately keyed. Each of these three dipoles has a length equal to one quarter of an operating wavelength and is individually tuned together with a counterpoise $G_1$, $G_2$ and $G_3$, respectively, which may be metallic plates, metallic meshworks and the like. The radiating dipole D is continually fed from a high frequency oscillation generator S through a transformer T. The tuning of the reflector dipoles $R_1$ and $R_2$ is accomplished by means of inductance coils $L_1$ and $L_2$ and rotatable condensers $C_1$ and $C_2$, respectively. These condensers are driven by an electromotor Mo in such manner that one reflector is alternately tuned and detuned whilst the other reflector is respectively detuned and tuned. A carrier wave as shown by the dash line in the upper part of Fig. 1 is thereby obtained. The spindles of the rotatable vane or vanes of the condensers $C_1$ and $C_2$ are mechanically coupled with the rotor shaft of the motor Mo common thereto. Alternatively, each of the condensers $C_1$ and $C_2$ may be individually driven by a separate synchronous motor fed from a common mains supply. The last facility simplifies the structural design of the rotating radio beacon transmitter since it does away with the long driving shaft necessarily required between the comparatively widely spaced reflectors in the first mentioned arrangement.

The different low frequency signals $f_1$ and $f_2$ of exact predetermined length referred to in the foregoing with which the high frequency carrier signals shall be modulated are produced in a modulation frequency generator $M_1$. The modulation frequencies are according to still a further feature of my invention applied to a rotatable distributing commutator $K_1$, which by way of example may be fixedly mounted on and rotated with the driving shaft of the condensers which control the tuning and detuning conditions of the reflectors. The commutator $K_1$ is so constructed as to intermittently impress the proper modulation frequency upon the high frequency generator S when the appertaining directional radiation pattern is rendered effective during a given period of time, as indicated at A in Fig. 1.

Commutator $K_1$ may, for example, be constructed in the manner shown in Fig. 2A. It consists of three discs 10, 11 and 12, operatively associated with three brushes 13, 14, 15, respectively. Disc 10 is provided with two conducting segments 16, 17 so that for periods of time corresponding to the center of $Z_1$, $Z_2$, circuits will be completed to transmit $f_1$, $f_2$. During the period of contact of brush 13 and segment 16, brush 14 is in contact with an insulating segment 18 of ring 11, and brush 15 is conductively associated with ring 12 so that $f_1$ is applied. However, when brush 13 is in contact with segment 17, brush 14 is conductively associated with disc 11 and brush 15 is on an insulating segment 19 of disc 12, so that $f_2$ is then applied. During the remaining portion of the revolution brush 13 is on insulating segments so that neither $f_1$ or $f_2$ are transmitted.

A similar modulation generator $M_2$ supplies two other frequencies $f_3$, $f_4$ to S by a similar distributing commutator $K_2$, the purpose of which will be described later. This commutator $K_2$ is arranged to be operative to apply $f3$ and $f4$ to $S$ during the periods $Z_1'$, $Z_2'$.

The Fig. 3 embodies a rotatable condenser which may suitably be adapted to control the keying of the reflectors $R_1$ and $R_2$. The desirable shape of the keyed carrier wave is the trapezoidal form having a gradually ascending and a gradually descending wave front with an intermediate zone of constant amplitude. Such trapezoidal wave form may be obtained by correspondingly forming the plates or vanes of the condenser. In cases that the rotor and stator plates are cut radially with respect to the axis of the rotor of a condenser, as for instance shown in Fig. 3, steep wave fronts will be obtained since the condenser involves a large initial capacity as soon as the movable plate or vane interlocks with the stationary plates. A gradual capacitance increase and decrease may be obtained when the plates are formed with parallel edges. It is thus obvious that the wave form may be chosen at will. The rotor of the condenser shown in Fig. 3 comprises four vanes 1, 2, 3 and 4, of which the vanes 1 and 3 may be used for producing the high frequency carrier signal $Z_1$ while the non-modulated intermediary high frequency signal $Z_1'$ may be produced by means of the vanes 2 and 4.

The operation of the rotating radio beacon transmitter described in the foregoing is such that the low frequency modulated directional radiation patterns are keyed only over a given angular range with respect to a given zero or reference signal, while unmodulated high frequency signals follow during the remainder of one revolution or operating cycle of the rotating radio beacon. This condition is schematically shown in Fig. 4, in which the references $D_1$ and $D_2$ denote the alternately keyed directional radiation patterns. These patterns are keyed and modulated with the proper low frequency $f1$ and $f2$, respectively, during one half cycle of the beacon rotation, e. g. from the north compass direction via east to south as indicated by the arced line $f1f2$ in Fig. 4. The non-directional reference signal is given when the dash line passes through the compass direction north, while the patterns remain unmodulated during the remainder of the cycle, that is, from the south via west to north.

The above mentioned arrangement operates with high accuracy, unless the receiving position is located in a zone adjacent to the zero reference, that is, in the compass line north-to-south, in which case the signals of one kind cannot be counted, and the width of the radiation beam upsets the position determination. Attempts have been made in the past to overcome this disadvantage by transmitting the non-directional reference signal at different compass directions so as to permit the signal counting in the receiving position to be made from different compass references. The last mentioned method has been achieved by variably emitting the non-directional signal according to any predetermined law either when the dash line passes through the north or the east compass direction, for example, in such manner that the reference signal be transmitted several times at the moment when the dash line passes through the north point, whereupon the signal is sequentially emitted when the dash line coincides with the east compass direction. However, this necessitates the broadcasting of a specific auxiliary signal at each change of reference direction in order to inform the pilot which reference signal, that is, that of the north or that of the east, is the determinant for the counting operation.

It will be obvious to everybody skilled in the art that this method is rather unsatisfactory since a selective choice of reference cannot be made by the pilot in response to a momentary disadvantageous position as mentioned above, bearing in mind that the shift of the reference signal from north to east, and vice versa, is accomplished in the transmitting position.

It has been mentioned in the foregoing that intermediary non-modulated signals, such as $Z_1'$ and $Z_2'$ in Fig. 1, are radiated in the pauses between the succession of carrier signals $Z_1$ and $Z_2$ which are modulated with the different low frequencies $f1$ and $f2$ in order to improve the regulation in the direction finder apparatus. Now, according to a feature of my invention, means are provided comprising modulation generator $M_2$ and distributor $K_2$ for likewise modulating these intermediary carrier signals with low frequency distinguishing signals, the frequencies of which differ from those heretofore referred to. This facility overcomes the last mentioned drawback in a simple manner. Referring to Fig. 4, the pair of low frequency signals $f1$ and $f2$ are radiated cooperatively with a zero reference signal emitted when the continuous dash line passes through the compass direction north as heretofore described, and a pair of further different low frequency signals $f3$ and $f4$, the frequencies of which differ from those of the first mentioned, are emitted cooperatively with a further zero reference signal transmitted at the moment when the dash line passes through a second compass or reference direction which in the embodiment shown is assumed to be the east. The last mentioned pair of signals is then effective from the east compass direction via south to west. It is clear, therefore, that the modulator supply generators $M_1$ and $M_2$ operate to supply modulator signals distributed in the manner indicated. It is obvious that a switching arrangement may operate depending on the rotary position of the beacon to render $M_1$ operative only from north to south and $M_2$ operative only in the east to west directions.

The conditions obtained by this arrangement during the east to south quadrant are schematically shown in Fig. 5. The rectangular characteristic at $a$ shows the keyed high frequency carrier wave. The different low frequency signals $f1$, $f2$, $f3$ and $f4$ with which the wave is modulated are indicated by differently hatched rectangles. The low frequency modulations effective in the output circuit of a coacting receiver are shown at $b$. In the similar way as explained in connection with Fig. 1, the signals above the zero or reference axis are produced by one of the directional radiation patterns, while those below this axis are produced by the other of said patterns. The two patterns are continually produced one after the other and are alternately modulated with one pair of low frequency signals thus, the first pattern carries the low frequency modulation signal $f1$, the second pattern the low frequency signal $f2$, then the first pattern becomes modulated with the low frequency signal $f3$ and the second pattern with the low frequency signal $f4$, whereupon this cycle is again commenced. The modulation frequencies $f1$ and $f2$ are effective when the rotating continuous dash line passes from the north via east to south with the reference located in the north compass direction, while the other two modulation frequencies f3 and f4 are effective from the compass direction east via south to the west thus having the reference signal in the compass direction east.

Consequently, the novel method of modulating the carrier wave with different pairs of low frequency distinguishing signals as proposed in accordance with this invention involves the essential advantage that the pilot may selectively adjust the receiver to respond to either of the groups of signals, that is, to the low frequency signals f1 and f2 having their corresponding reference signal transmitted when the continuous dash line passes through the north, or to the signals f3 and f4 the corresponding zero signal of which is effective at the moment when the dash line passes through the compass direction east, dependent upon the momentary position of the vehicle and which reference signal is the most suitable for obtaining the desired bearings. It is thus possible to secure perfect operation without the provision of any auxiliary marking or the like signals, or even reversible switching means in the radiating transmitter.

What is claimed is:

1. In a radio direction finding system, a rotating radio beacon transmitter comprising, a radiating dipole, a high frequency oscillation generator continually coupled with said radiating dipole for producing a non-directional radiation diagram, two reflecting dipoles disposed on either side of and in one line with the said radiating dipole and spaced apart therefrom, a counterpoise cooperatively allotted to each of said dipoles, an oscillatory circuit comprising a fixed inductance and a variable capacity connected between each of said reflecting dipoles and the appertaining of said counterpoises for individually tuning said dipoles to the operating wavelength, means to alternately and gradually tune and detune said reflectors for producing in cooperation with said radiating dipole directional radiation patterns having constant amplitudes during a predetermined interval of time and forming a line of constant field intensity, means for continually causing said line of equal field intensity to rotate, a low frequency source generating a plurality of different modulation frequencies, and means to alternately apply a succession of said modulation frequencies to the said high frequency oscillation generator during periods of exactly determined length shorter than the intervals during which the said radiation patterns involve constant amplitudes and in synchronism with the operation of the said means tuning and detuning said reflectors for intermittently modulating the said directional radiation patterns with different low frequency signals of given length.

2. The invention according to claim 1, characterized in that the said means adapted to alternately and gradually tune and detune said reflectors are rotatable condensers, the configuration of the stator and rotor plates of said condenser being determinant for the interval of time during which the said directional radiation patterns involve constant amplitudes.

3. The invention according to claim 1, characterized in that the said means adapted to alternately and gradually tune and detune said reflectors are rotatable condensers each driven by a synchronous electromotor.

4. The invention according to claim 1, characterized in that the said means adapted to alternately and gradually tune and detune said reflectors are rotatable condensers each mechanically coupled with a driving synchronous electromotor common thereto.

5. The invention according to claim 1, characterized in that the said means adapted to alternately apply a succession of said modulation frequencies to the said high frequency oscillation generator is a rotatable commutator, the rotation of which is controlled in response to the operation of the said reflector tuning and detuning means.

6. In a radio direction finding system, a rotating radio beacon transmitter comprising, a radiating dipole, a high frequency oscillation generator continually coupled with said radiating dipole for producing a non-directional radiation diagram, two reflecting dipoles disposed on either side of and in one line with the said radiating dipole and spaced apart therefrom, means adapted to alternately tune and detune said reflectors for producing in cooperation with said radiating dipole different directional radiation patterns involving constant amplitudes during a predetermined interval of time and forming a line of constant field intensity, means for causing the said line of equal field intensity to continuously perform rotational cycles of 360 degrees in the horizontal plane, a low frequency source generating a plurality of different modulation frequencies, and means adapted to alternately apply during one half rotational cycle of said line of constant field intensity one succession of different modulation frequencies and during another half rotational cycle which is displaced at 90 degrees with respect to the first mentioned half cycle a further succession of different modulation frequencies to the said high frequency oscillation generator during periods of exactly determined length shorter than the intervals during which the said directional radiation patterns involve constant amplitudes and in synchronism with the operation of the said reflector tuning and detuning means for intermittently modulating the said directional radiation patterns with two different successions of unlike low frequency signals of given length.

7. The invention according to claim 6, characterized in that means is provided to control the effective intervals of either of said reflecting dipoles so that said interval is at least as long as but preferably longer than the period of time during which the said high frequency oscillation generator is modulated with any of the said modulation frequencies.

HEINRICH NASS.